US006855783B2

United States Patent
Gauthier et al.

(10) Patent No.: US 6,855,783 B2
(45) Date of Patent: Feb. 15, 2005

(54) SUPPORTED METALLOCENE CATALYSTS

(75) Inventors: William J. Gauthier, Houston, TX (US); Margaret Kerr, Worcester, MA (US); Jun Tian, LaPorte, TX (US); David J. Rauscher, Angleton, TX (US); Constance Hayworth Patrick, Conroe, TX (US); Shady Henry, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/412,372

(22) Filed: Apr. 11, 2003

(65) Prior Publication Data

US 2004/0204310 A1 Oct. 14, 2004

(51) Int. Cl.⁷ .................................................. C08F 4/42
(52) U.S. Cl. ...................... 526/160; 526/351; 526/352; 526/943; 502/103; 502/152; 556/1; 556/11; 556/27; 556/43; 556/53; 556/58
(58) Field of Search ................................ 526/160, 943, 526/351, 352; 502/152, 103; 556/1, 11, 27, 43, 53, 58

(56) References Cited

U.S. PATENT DOCUMENTS

| 4,404,344 | A | 9/1983 | Sinn et al. |
|---|---|---|---|
| 4,522,982 | A | 6/1985 | Ewen |
| 4,767,735 | A | 8/1988 | Ewen et al. |
| 4,794,096 | A | 12/1988 | Ewen |
| 5,036,034 | A | 7/1991 | Ewen |
| 5,146,228 | A | 9/1992 | Irani et al. |
| 5,155,080 | A | 10/1992 | Elder et al. |
| 5,334,677 | A | 8/1994 | Razavi et al. |
| 5,451,649 | A | 9/1995 | Zenk et al. |
| 5,459,117 | A | 10/1995 | Ewen |
| 5,945,365 | A | 8/1999 | Reddy |
| 5,968,864 | A | 10/1999 | Shamshoum et al. |
| 6,414,095 | B1 | 7/2002 | Burkhardt et al. |
| 6,515,086 | B1 * | 2/2003 | Razavi ....................... 526/160 |

FOREIGN PATENT DOCUMENTS

EP    0 881 236 A1 * 12/1998

* cited by examiner

Primary Examiner—Ling-Siu Choi
(74) Attorney, Agent, or Firm—Tenley R. Krueger

(57) ABSTRACT

Supported metallocene catalysts and processes for the use of such catalysts in isotactic polymerization of a $C_{3+}$ ethylenically unsaturated monomer. The supported catalysts comprise a particulate silica support, an alkyl alumoxane component, and a metallocene catalyst component. The support has an average particle size of 10–50 microns, a surface area of 200–800 $m^2/g$ and a pore volume of 0.9–2.1 milliliters per gram (ml/g). Alumoxane is incorporated onto the support to provide a weight ratio of alumoxane to silica of at least 0.8:1. The metallocene is present in an amount of at least 1 weight percent of the silica and the alumoxane and is of the formula $B(CpRaRb)(Fl')MQ_2$ in which Fl' is an unsubstituted fluorenyl group or a fluorenyl group symmetrically substituted at the 3 and 6 positions, B is a structural bridge between Cp and Fl', Ra is a bulky substituent in a distal position, Rb is a less bulky substituent proximal to the bridge and non-vicinal to the distal substituent, M is a Group IVB transition metal or vanadium, and Q is a halogen or a $C_1$–$C_4$ alkyl group.

57 Claims, 2 Drawing Sheets

Estimated Response Surface

SUPPORTED METALLOCENE CATALYSTS

FIELD OF THE INVENTION

This invention relates to catalysts and processes for the production of isotactic alpha olefins and more particularly to supported bridged cyclopentadienyl-fluorenyl metallocenes which are supported on alumoxane-treated silica supports and their use.

BACKGROUND OF THE INVENTION

Syndiotacticity and isotacticity involve two broad classes of stereospecific structure formations which may be involved in the formation of stereoregular polymers from various monomer units. Syndiotactic polymers, such as syndiotactic polypropylene, have a stereochemical structure in which the monomeric units have an enantiomorphic configuration in which the methyl groups on the asymmetrical carbon atoms follow each other alternatively and regularly in the main polymer chain. Isotactic polymers such as isotactic polypropylene generally are characterized as having the methyl groups on the repeating units with identical sequence configurations as contrasted with the alternating configurations of syndiotactic polymers. Such structures may be described by conventional and well-known graphical representations, such as Fischer projection and corresponding NMR pentad sequences as disclosed, for example, in U.S. Pat. Nos. 5,334,677 to Razavi et al and 4,522,982 to Ewen. While isotacticity and syndiotacticity are useful in defining these two broad types of crystalline polymer configurations, alternatives of both are known in the prior art. For example, so-called stereoblock polymers, such as disclosed in the aforementioned patent to Ewen, may be involved. Also a specialized form of isotactic polypropylene in which alternative polymer units achieve a random asymmetricity can be formed as stereoblock polymers which can be formed, for example, of alternating isotactic blocks. Various monomers which can be stereospecifically propagated include the ethylenically unsaturated monomers such as $C_3$+ alpha olefins, such as propylene and 1-butene; dienes, such as 1,3-butadiene; substituted vinyl compounds, such as vinyl chloride or vinyl aromatic compounds, e.g. styrene; and vinyl ethers, such as alkyl vinyl ethers, e.g. isobutylvinyl ether or even arylvinyl ethers. As indicated above, the most significant application of stereospecific polymerization is in the production of isotactic or syndiotactic polypropylene.

Catalyst systems useful in the formation of isotactic polyolefins include the racemic bis-indenyl compounds of the type disclosed in U.S. Pat. No. 4,794,096 to Ewen. Those useful in the propagation of syndiotactic polypropylene and like syndiotactic polymers include stereorigid metallocenes and bridged cyclopentadienyl fluorenyl ligands, as disclosed, for example, in U.S. Pat. No. 5,334,677 to Razavi et al and U.S. Pat. No. 5,155,080 to Elder et al. A variation of such cyclopentadienyl fluorenyl ligand structures, which are substituted so as to produce a lack of bilateral symmetry, are disclosed in U.S. Pat. No. 5,036,034 to Ewen to produce hemi-isotactic polypropylene.

The catalysts most widely used in the formation of isotactic polyolefins take the form of bis(indenyl) compounds such as disclosed in the aforementioned U.S. Pat. No. 4,794,096. Other isospecific metallocenes are somewhat similar to syndiospecific metallocenes in that they are based upon cyclopentadienyl fluorenyl ligand configurations. One type of catalyst useful for the isospecific polymerization of olefins is disclosed in U.S. Pat. No. 5,416,228 to Ewen et al. Here, the ligand structure is configured so that one cyclopentadienyl group of a bridged ligand has a bulky group on one and only one of the distal positions of a cyclopentadienyl ring. Typical of such metallocenes is isopropylidene (3-tertiary butyl cyclopentadienyl fluorenyl) zirconium dichloride. These compounds, while similar to the syndiospecific metallocenes such as disclosed in U.S. Pat. No. 5,334,677 to Razavi et al, are, by virtue of the substituent group at the distal position on the cyclopentadienyl ring, characterized by a lack of bilateral symmetry. The metallocene catalysts may be supported on chemically inert solids including inorganic oxides such as silica.

Other isospecific metallocenes based on cyclopentadienyl fluorenyl ligand structures are disclosed in European Patent Publication No. 0881,236A1 to Razavi. Here, the ligand structures are characterized by bridged cyclopentadienyl and fluorenyl groups in which the cyclopentadienyl group is substituted at both proximal and distal positions. The distal substituent is preferably a bulky group such as a tertiary butyl group, and the proximal substituent is a less bulky group such as a methyl group which may be either vicinal or non-vicinal to the distal substituent. The fluorenyl group may be substituted or unsubstituted with up to eight substituent groups but preferably are unsubstituted at the positions which are distal to the bridgehead carbon atom. Specifically disclosed in EPO 881,236A1 are isopropylidene(3-tertiary butyl, 5-methyl cyclopentadienyl fluorenyl) zirconium dichloride and isopropylidene(3-tertiary butyl, 2-methyl cyclopentadienyl fluorenyl) zirconium dichloride. Similarly, as described above, with reference to the Razavi et al '677 patent, the metallocenes here may be supported on inorganic oxides with the preferred support being silica. In the Razavi EPO publication, the preferred support is silica having a surface area of between 200–700 $m^2$/g. and a pore volume between 0.5 and 3.0 ml/g.

Yet another isospecific metallocene based upon bis (fluorenyl) ligand structures is disclosed in U.S. Pat. No. 5,945,365 to Reddy. Here, the ligand structure is characterized by two bridged fluorenyl groups with 1 or 2 substituents at distal positions on each fluorenyl group with one group of substituents being located transversely from the other with respect to a plane of bilateral symmetry extending through the bridge group.

SUMMARY OF THE INVENTION

In accordance with the present invention, there are provided supported metallocene catalyst compositions and processes for the use of such catalysts in the isotactic polymerization propagation of a polymer chain derived from ethylenically unsaturated monomers which have three or more carbon atoms and/or are substituted vinyl compounds. The polymer chain may be a homopolymer, specifically isotactic polypropylene homopolymer, or it may be a random copolymer of ethylene and propylene, preferably having an ethylene content of no more than 10 weight percent.

The supported catalyst composition of the present invention comprises a particulate silica support, an alkyl alumoxane cocatalyst component, and a metallocene catalyst component. The silica support preferably has an average particle size within the range of 10–50 microns and a surface area within the range of 200–800 $m^2$/g and more preferably within the range of 300–800 $m^2$/g. The silica support preferably has a pore volume within the range of 0.9–2.1 milliliters per gram (ml/g). The alumoxane cocatalyst component is incorporated onto the silica support to provide a weight ratio of alumoxane to silica of at least 0.8:1 and preferably at least 1:1. The metallocene component is supported on the silica support in an amount of at least 1 weight percent of the combined amount of the silica and the alumoxane. Preferably, the metallocene component is present on the silica support in an amount of at least 1.5 weight percent. The metallocene catalyst incorporates a substituted cyclopentadienyl fluorenyl ligand structure and is characterized by the formula $$X(CpR_nR'_m)(FlR''_{n'})  \quad (1)$$

wherein

Cp is a cyclopentadienyl group

Fl is a fluorenyl group,

X is a structural bridge between Cp and Fl imparting stereorigidity to the metallocene, R is a substituent on the cyclopentadienyl group, n is 1 or 2

R' is a substituent on the cyclopentadienyl group at a position which is proximal to the bridge, m is 1 or 2, Each R'' is the same or different and is a hydrocarbyl group having from 1 to 20 carbon atoms with R'' being substituted on a nonproximal position on the fluorenyl group and at least one other R'' being substituted at an opposed nonproximal position on the fluorenyl group, n' is 2 or 4, M is a group IVb transition metal or vanadium, and Q is a halogen or a $C_1$–$C_4$ alkyl group.

In a preferred embodiment of the invention, the metallocene catalyst component incorporates a substituted cyclopentadienyl-fluorenyl ligand structure and is characterized by the formula $$B(CpRaRb)(FlR'_2)MQ_2  \quad (2)$$

wherein:

Cp is a substituted cyclopentadienyl group,

Fl is a substituted fluorenyl group, and

B is a structural bridge between Cp and Fl imparting stereorigidity to said catalyst, Ra is a substituent on the cyclopentadienyl group which is in a distal position to the bridge and comprises a bulky group of the formula $XR^*_3$ in which X is carbon or silicon and R* is the same or different and is chosen from hydrogen or a hydrocarbyl group having from 1–20 carbon atoms provided that at least one Rb is not hydrogen, Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group containing from 1 to 7 carbon atoms and is less bulky than the substituent R, each R' is the same or different and is a hydrocarbyl group having from 1–20 carbon atoms with one R' being substituted at a non-proximal position on the fluorenyl group and the other R' being substituted at an opposed non-proximal position on the fluorenyl group, M is a Group IVB transition metal or vanadium; and Q is a halogen or a $C_1$–$C_4$ alkyl group. The alumoxane component and the metallocene component are present in relative amounts to provide a mole ratio of aluminum to the transition metal M of at least 150. Preferably, the Al/M mole ratio is at least 250 and the weight ratio of alumoxane to silica is at least 1:1.

In a preferred embodiment of the invention, the distal substituent Ra on the cyclopentadienyl group is selected from the group consisting of $C(CH_3)_3$, $C(CH_3)_2Ph$, $CPh_3$, and $Si(CH_3)_3$ and the proximal substituent on the cyclopentadienyl group is a methyl group. The substituents on the fluorenyl group are preferably tertbutyl groups. The bridge B of the metallocene component can be any suitable bridge moiety of the type known to those skilled in the art to impart stereorigidity to cyclopentadienyl-fluorenyl metallocene structures but is preferably selected from the group consisting of an alkylidene group having 1 to 20 carbon atoms, a dialkyl germanium or silicon or siloxane, an alkyl phosphine, or amine. Preferably, X is a methylene group, an isopropylidene group, a phenylmethylene group, a diphenylmethylene group, a methylsilyl group, a dimethylsilyl group, a phenylsilyl group, or a diphenylsilyl group.

In a further aspect of the present invention, the metallocene catalyst component is characterized by the following structural formula:

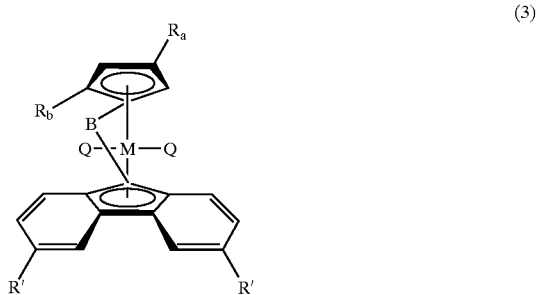

(3)

wherein

Ra is a bulky hydrocarbyl group containing from 4 to 20 carbon atoms,

Rb is a methyl group, an ethyl group, or an isopropyl group,

R' is a bulky hydrocarbyl group containing from 4 to 20 carbon atoms,

M is a transition metal selected from the group consisting of titanium, zirconium, hafnium, and vanadium, Q is a halogen or a $C_1$–$C_4$ hydrocarbyl group, B is a structural bridge extending between the cyclopentadienyl and fluorenyl groups, and is an ethylene group or is characterized by the formula:

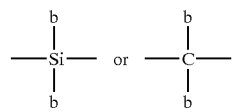

wherein b is a $C_1$, $C_2$, $C_3$, or $C_4$ alkyl group, a phenyl group, a substituted phenyl group, or H.

Preferably, the substituent Ra in Formula (3) is a tert-butyl group, a phenyldimethyl group, or a triphenyl group, and the substituent Rb is a methyl group. In this preferred embodiment, the substituent R' on the fluorenyl group of Formula (3) is an isobutyl group, a phenyldimethyl group, or a triphenylmethyl group, and the bridge B is a dimethylsilyl group, a diphenylsilyl group, and diphenylmethylene group, or an isopropylidene group. In a specific embodiment of the present invention, the metallocene component comprises isopropylidene ((diphenyl methylene 3-tertiary butyl, 5-methyl cyclopentadienyl, 3,6-ditertiary butyl fluorenyl) zirconium dichloride or the dimethyl analogue.

In a further aspect of the present invention, there is provided a method for the isospecific propagation of a polymer chain derived from at least one ethylenically unsaturated monomer. In this aspect of the invention, a silica supported metallocene alumoxane catalyst system as described above is contacted in a polymerization reaction zone with an ethylenically unsaturated monomer which contains 3 or more carbon atoms or which is a substituted vinyl compound. The ethylenically unsaturated monomer is supplied to the reaction zone with or without hydrogen as a molecular weight controller. Hydrogen can be supplied in an amount to provide a hydrogen content in the reaction zone of at least 20 parts per million (ppm) based upon the monomer. In some cases, hydrogen can be supplied to the reaction zone to provide a hydrogen content of at least 30 ppm based upon the monomer. A specific application of the present invention is in the polymerization of propylene to produce polypropylene. However, in addition to the homopolymer, ethylene and propylene may be introduced into the reaction zone to produce an ethylene/propylene copolymer of isotactic structure. Preferably, only a relatively small amount of ethylene is employed so as to provide a copolymer containing no more than 10 weight percent ethylene. To produce the propylene homopolymer, the reaction zone is normally operated at a temperature within the range of 60–70° C., preferably an average temperature of 65–70° C., to provide isospecific polymerization of the monomer at an activity of at least 1000 grams of polymer per gram of catalyst per hour. To produce an ethylene propylene random copolymer the reaction zone temperature should be within the range of 55–65° C. Preferably, an alkyl aluminum cocatalyst is introduced into the reaction zone in an amount to provide a molar ratio of aluminum derived from the alkyl aluminum polymerization cocatalyst to the transition metal, M, of between 50 and 8,000. The polymerization reaction is carried out to provide polypropylene fluff having a melting temperature within the range of 155–160° C. Where the metallocene is of the type characterized by formula (3), where the metallocene has 3,5 substitution on the cyclopentadienyl group but is unsubstituted on the fluorenyl group the propylene homopolymer has a melting temperature of about 142° C. The isotacticity of the resulting polymer fluff is characterized by an isotactic pentad mmmm of about 95% or more. Preferably, the polymerization cocatalyst is triethylaluminum used in an amount to provide an Al/M molar ratio of 50 to 1500. In a preferred embodiment of the invention, the silica support is characterized by a silica having an average surface area of about 650–800 m$^2$/g and an average particle size within the range of 10–25 microns. In one aspect of the invention, the silica particle exhibits a pore volume characteristic resulting in alumoxane loading primarily on the surface of the particle, and in another embodiment of the invention, the silica support exhibits pore volume in which the resulting alumoxane distribution is throughout the interior of the silica particle. More specifically, there is provided a silica support having an average particle size of about 12 microns, a surface area of about 760 m$^2$/g, and a pore volume of about 0.9 milliliters per gram. Another specific silica support providing for internal distribution of metallocene is characterized by an average particle size of about 12 microns, a surface area of about 700 m$^2$/g, and a pore volume of about 2.1 ml/g.

In yet a further embodiment of the present invention, isospecific propagation of an ethylenically unsaturated monomer as described above is carried out with a silica-supported metallocene/alumoxane catalyst system in which the silica support is characterized by an average particle size of about 21 microns, a surface area of about 600 m$^2$/g and a pore volume of 1.7 ml/g. Here, the metallocene supported on this support may be the metallocene characterized by Formula (2) as described above, or it may take the form of a metallocene similar to that of Formula (2) but incorporating a ligand structure in which the fluorenyl group is not substituted. Specific ligand structures involved in this embodiment of the invention are those corresponding to Formula (2) (with the exception that the fluorenyl group is not substituted, i.e., R' is not present) in which Rb is a methyl, ethyl group, or isopropyl group, and Ra is a bulky hydrocarbyl group containing from 4 to 20 carbon atoms with the other structural components being as identified above with reference to Formula (2). Specific ligand structures involved in this embodiment of the invention are isopropylidene bridged (3-tert-butyl-5-methyl cyclopentadienyl) (fluorenyl) and isopropylidene bridged (3-tert-butyl-5-ethyl cyclopentadienyl) (fluorenyl) ligand structures. Here the polymerization reaction is carried out to provide polypropylene fluff having a somewhat lower melting temperature of about 140° C.

The metallocene catalyst component, preferred for use with this silica support, can be characterized by the formula:

$$B(CpRaRb)(Fl')MQ_2 \qquad (4)$$

wherein:

$C_p$ is a substituted cyclopentadienyl group,

Fl' is an unsubstituted fluorenyl group or a fluorenyl group which is symmetrically substituted at the 3 and 6 positions with $C_1$–$C_4$ hydrocarbyl groups, and B is a structural bridge between Cp and Fl' imparting stereorigidity to said catalyst, Ra is a substituent on the cyclopentadienyl group which is in a distal position to the bridge and comprises a bulky group of the formula $XR*_3$ in which X is carbon or silicon and R* is the same or different and is chosen from hydrogen or a hydrocarbyl group having from 1–20 carbon atoms, provided that at least one R* is not hydrogen, Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group containing from 1 to 7 carbon atoms and is less bulky than the substituent Ra, M is a Group IVB transition metal or vanadium; and Q is a halogen or a $C_1$–$C_4$ alkyl group.

DETAILED DESCRIPTION OF THE INVENTION

Figure 1:
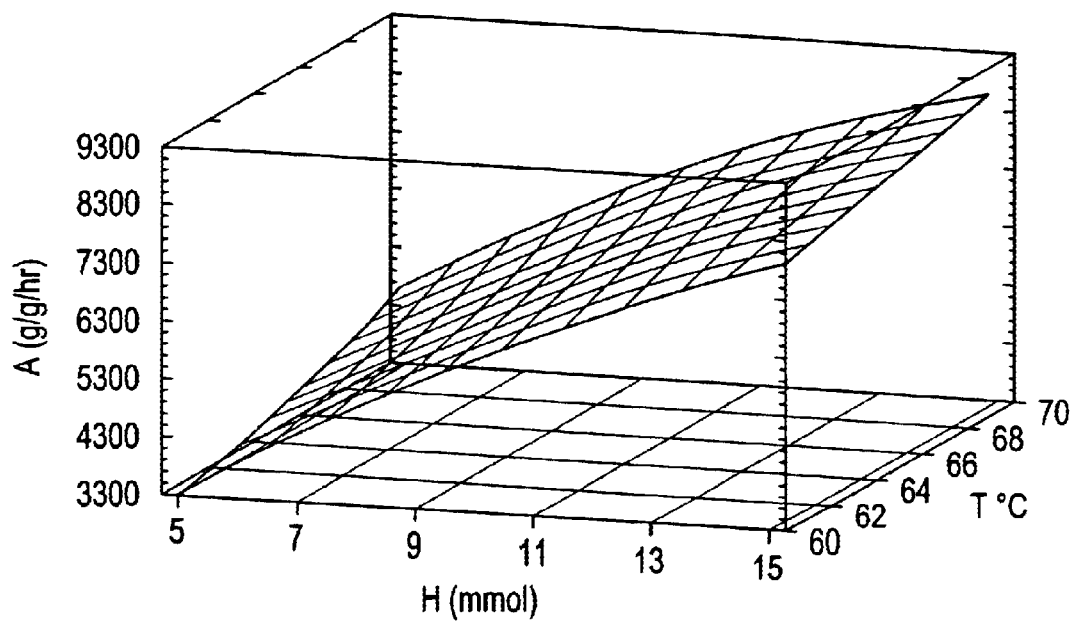
FIG. 1 is a perspective three-dimensional graph showing the estimated response of catalyst activity plotted on the ordinate versus hydrogen in millimoles plotted on the Y axis and reaction temperature in degrees C. plotted on the Z axis.

The present invention involves certain supported bridged cyclopentadienyl-fluorenyl metallocenes and their use as catalysts in isotactic polymer propagation. The term "bridged metallocenes" involved in the present invention involves inorganic coordination compounds in which a cyclopentadienyl group and a fluorenyl group are bridged together with a structural bridge to provide a stereorigid structure and which are coordinated to a central metal ion which may be provided by a Group 3, 4, or 5 transition metal or metal halide, alkyl alkoxy, aryloxy, or alkoxy halide aryl or the like. The term "molecular sandwich" is sometimes applied to such structures since the two components of the ligand structure are oriented above and below the plane of the central coordinated metal atom. The structural bridge interconnecting the cyclopentadienyl-fluorenyl ligand structure imparts stereorigidity to the metallocene complex to prevent rotation of the cyclopentadienyl and fluorenyl groups about their coordination axes with the transition metal atom.

Cyclopentadienyl-fluorenyl ligands may be characterized by the following structural formula in which the upper and lower cyclopentadienyl and fluorenyl groups are interconnected by a chemical bridge B as described previously.

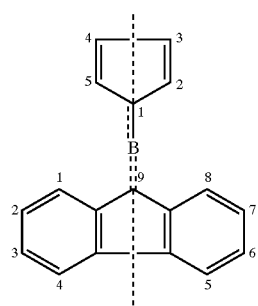

(4)

Formula (5) indicates the numbering scheme used herein in which the bridge head carbon atom of the cyclopentadienyl group is numbered 1 and the bridge head carbon atom of the fluorenyl group is 9. The non-conjugated carbon atoms of the fluorenyl group are numbered in a sequence in which the directly proximal carbon atoms are numbered 1 and 8 and the distal carbon atoms are numbered 3, 4, 5, and 6. This numbering sequence is shown in the above Formula (5). It is a conventional practice to refer to the symmetry of such ligand structures in terms of a line of symmetry which extends through the two bridge head carbon atoms and the structural bridge as shown by the vertical broken line of Formula (5). The present invention employs cyclopentadienyl-fluorenyl metallocene structures which are substituted in a manner to provide an asymmetrical conformation to the cyclopentadienyl group and a symmetrical conformation to the fluorenyl group. In this conformation, the cyclopentadienyl group is substituted on one side of the broken line at the distal position with a relatively bulky group and on the other side of the broken line at the non-vicinal proximal position with a less bulky group. The fluorenyl group is substituted on both sides of the broken line. Both substitutions occur at distal carbon atoms 3 and/or 4 and 5 and/or 6 in a manner to provide a symmetrical structure.

Substituents on the fluorenyl group at the 3,6 positions or on the cyclopentadienyl group at the 3 position which are relatively bulky, including tertiary-butyl groups and phenyl groups which can be substituted or unsubstituted. Substituted phenyl groups attached to the fluorenyl ligand at the 3,6 positions or on the cyclopentadienyl group at the 3 position (Ra in Formula 3) include 2,6 dimethylphenyl and 2,6 trifluoromethyl groups. Other 2,6 substituents on the phenyl groups include ethyl and isopropyl groups.

While the present invention is described in detail herein in regard to the polymerization of propylene to produce isotactic polypropylene, it is to be recognized that other ethylenically unsaturated monomers may be subjected to polymerization in accordance with the present invention. Such alpha olefins and other ethylenically unsaturated monomers are disclosed in U.S. Pat. Nos. 5,451,649 to Zenk et al and 5,459,117 to Ewen and include broadly organic molecules having a terminal vinyl group, including various alpha olefins, in addition to propylene, such as 1-butene, 1-pentene, 1-hexene, 4-methyl-1-pentene and the like; vinyl halides including vinyl fluoride, vinyl chloride, and the like; vinyl arenes including styrene, alkylated styrenes, halogenated styrenes, haloalkylated styrenes and the like; dienes such as 1,3-butadiene and isoprene (i.e. 1,2-addition). As noted previously, copolymers of such ethylenic monomers, specifically ethylene/propylene copolymers or even terpolymers, can be produced in accordance with the present invention.

The metallocenes of the present invention can be employed in conjunction with a suitable scavenging or polymerization cocatalyst which can be generally characterized by organo-metallic compounds of metals of Groups IA, IIA, and IIIB of the Periodic Table of Elements. As a practical matter, organoaluminum compounds are normally used as cocatalysts in polymerization reactions. Some specific examples include triethyl aluminum, tri-isobutyl aluminum, diethyl aluminum chloride, diethyl aluminum hydride and the like.

The supported cocatalyst component is an alumoxane (also referred to aluminoxane or poly hydrocarbyl aluminum oxides). Such compounds include those oligomeric or polymeric compounds having repeating units of the formula:

(6)

where R is an alkyl group generally having 1 to 5 carbon atoms. Alumoxanes are well known in the art and are generally prepared by reacting an organo aluminum compound with water, although other synthetic routes are known to those skilled in the art, Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms, whereby the aluminum carries a substituent, preferably an alkyl group. The exact structure of linear and cyclic alumoxanes is not known but is generally believed to be represented by the general formulae —(Al(R)—O—)—m for a cyclic alumoxane, and $R_2Al$—O—(Al(R)—O)m—$AlR_2$ for a linear compound wherein R independently each occurrence is a $C_1$–$C_{10}$ hydrocarbyl, preferably alkyl or halide and m is an integer ranging from 1 to about 50, preferably at least about 4. Alumoxanes also exist in the configuration of cage or cluster compounds. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes. Preferred alumoxanes are methylalumoxane and methylalumoxane modified with minor amounts of other higher alkyl groups such as isobutyl. Alumoxanes generally contain minor to substantial amounts of starting aluminum alkyl compounds. The preferred cocatalyst, prepared either from trimethylaluminum or triethylaluminum, is sometimes referred to as poly (-methyl aluminum oxide) and poly (ethyl aluminum oxide), respectively.

In one set of experimental work respecting the invention, a series of polymerizations were conducted in carrying out the homopolymerization of propylene to produce isotactic polypropylene. In this experimental work, the same isospecific metallocene component, isopropylidene (3-tertiary butyl, 5-methyl cyclopentadienyl) (3,6-ditertiary butyl fluorenyl) zirconium dichloride and the same supported cocatalyst component were employed throughout in order to maintain control when going from one set of polymerization conditions to the other. However, metallocene loading and alumoxane loading were varied as were hydrogen content, polymerization temperature, and the amount of alkyl aluminum cocatalyst. In comparative polymerization tests, triethylaluminum (TEA1) was employed as the polymerization cocatalyst in order to ensure that the various catalyst components remained the same from one set of tests to the other.

In another set of experimental work, the isospecific metallocene component incorporated an unsubstituted fluorenyl ligand structure. The isospecific metallocene component was isopropylidene (3-tert-butyl-5-methylcyclopentadienyl) (fluorenyl) zirconium dichloride.

A number of silica supports were employed in carrying out the experimental work. The silica supports used in the experimental work are designated in Table I as Supports A, B, C, D, E, and F, together with the characteristic properties of particle size, surface area, and pore volume.

TABLE I

| | Support | | | | | |
| --- | --- | --- | --- | --- | --- | --- |
| | A | B | C | D | E | F |
| Avg. Particle Size (micron) | 12.1 | 20 | 12 | 90 | 97 | 21.4 |
| Surface Area (m²/g) | 761 | 300 | 700 | 306 | 643 | 598 |
| Pore volume (mL/g) | 0.91 | 1.4 | 2.1 | 3.1 | 3.2 | 1.7 |

The silicas identified in Table I can be obtained from commercial sources. Thus, silica Supports A and C can be obtained from the Asahi Glass Company under the designations H-121 and H-122, respectively. Silica B is available from Fuji Silysia Chemical, Ltd., under the designation P-10. The MAO and metallocene is preferentially supported inside the support for Silicas B and C, whereas the MAO and metallocene is primarily surface-supported in the case of Support A. Supports A, B, and C are of a roughly spheroidal configuration. Supports D and E can be formulated from commercially available silicas available from PQ Corporation under the designations M.S.-3030 and M.S.-3060, respectively. Silica Support F is of a spheroidal configuration and is available from the Asahi Glass Company under the designation H-202. This silica is preferred for use in conjunction with the metallocene component in which the fluorenyl group is unsubstituted although it also may be used as a support for the 3–6 substituted fluorenyl ligand structure.

The parameters measured in the coarse of the experimental work included activity of the catalyst reported in grams of polymer per hour of transition metal per gram and the polymer characteristics of bulk density, melting point, molecular weight, molecular weight distribution, percent xylene solubles, isotactic index reported in percent meso pentads, and melt flow index measured at 230° C. In addition, fouling (as a measure of polymer buildup during the polymerization procedure) was measured using a standardized technique from one polymerization run to another and is reported in terms of milligrams of polymer buildup per gram of polymer produced.

By way of background, the following provides a generalized description of typical procedures followed in the experimental work. As an example of the procedure used in preparation of methylaluminoxane on a silica support, the silica Sunsphere H121C, available from Asahi Glass Company) was dried in an oven at 150° C. for 24 hours. Dried silica (45 grams) was placed in a 3-necked 1 liter round-bottomed flask equipped with a reflux condenser, magnetic stir bar and sealed using rubber septa in a glove box. The flask containing the silica was removed from the glove box and connected to a double manifold schlenk line (argon/vacuum). Toluene (450 milliliters) was added to the silica and the slurry was allowed to homogenize for 10 minutes. Clear and gel-free methylaluminoxane (140 milliliters of 30 wt % MAO in toluene) was added slowly. The slurry was heated to reflux and maintained for 4 hours at which time the solution was allowed to cool to ambient temperature and the solids allowed to settle. The toluene solution was decanted from the flask and the remaining wet solids were washed sequentially with three 450 milliliter portions of toluene. The wet MAO/silica was washed with three 450 milliliter portions of hexane and the solids were dried for 3 hours in vacuo to yield a dry white powder (111 grams) containing a small amount of residual solvent.

As an example of the preparation of the supported metallocene catalyst, five grams of the above-produced MAO on the silica support and 50 milliliters of dry, deoxygenated toluene were added to a 100 milliliter round-bottomed flask. 100 mg of isopropylidene (3-tertiary butyl, 5-methyl cyclopentadienyl) (3,6-ditertiary butyl fluorenyl) zirconium dichloride and 10 milliliters of toluene were added to a 20 milliliter Wheaton vial. The metallocene catalyst was added to the slurry containing the MAO on silica via cannula and the contents was stirred for 1 hr. The solids were then allowed to settle and the mother liquor was decanted using a cannula. The solids were washed on a frit sequentially with three 50 milliliter portions of toluene followed by three 50 milliliter portions of hexane. The final catalyst was dried in vacuo for 1 hr to give a blue solid weighing 4.8581 grams. To the dried catalyst was added 46.2679 grams of purified mineral oil (dry & deoxygenated) to make a final catalyst slurry containing 9.5% solids.

Polymerizations were performed in liquid propylene using a stirred, autoclave type reactor with either 2 liter or 4 liter capacity. For a 2 liter reactor the reactor was charged with 360 grams of propylene and 5 mmols of hydrogen. The catalyst (36 mgs) was flushed into the reactor with 252 mg of TEAL and 360 grams of propylene at room temperature. The reactor temperature was ramped quickly (within 3 min) to about 70° C. and the polymerization was allowed to proceed for 1 h. Residual propylene and hydrogen were then flashed from the reactor and the polymer fluff was allowed to dry in air overnight. Catalyst activity values are reported as the grams of polymer produced/gram of catalyst used per hour (A=gram PP/gram cat/h).

Bulk density measurements were conducted by weighing the unpacked contents of a 100 milliliter graduated cylinder containing polymer powder and the results were reported as grams per cubic centimeter. Polymer melt flow was determined in accordance with ASTM D-1238 at 230° C. with a 2.16 Kg mass. Polymer powder was stabilized for the test with approximately 1 mg of 2,6-ditert-butyl-4-methylphenol (BHT) with the Melt flow reported as gram/10 min.

Fluff particle size distribution was recorded on a mechanical sieve shaker. A plot of particle size versus cumulative amount (0–100%) was used to estimate the $D_{10}$, $D_{50}$ and $D_{90}$. Fines are defined as the percentage by weight of particles less than about 106 μm in size. Catalyst and silica particle size distributions were measured using a Malvern Particle Size Analyzer.

Polymer samples were analyzed using a Perkin-Elmer Series 7 (power compensating unit) Differential Scanning Calorimeter. Samples were first heated to 210° C. at a rate of 110° C./minute, then held at 210° C. for 5 minutes to eliminate thermal history. The samples were then cooled to 50° C. at 10° C./min, held for 1 minute and then ramped to 190° C. at 10° C./minute. Melting temperatures and heats of fusion reported were taken from the second heat thermogram and the instrument was calibrated using Indium and Tin standards.

Molecular weight measurements were performed by Gel Permeation Chromatography using a Waters 150° C. at 135° C. with 1,2,4-trichlorobenzene as the elution solvent and BHT as the stabilizer. Three columns were used in series: two Shodex AT-806 and one Waters HT6E with a refractive index detector. Molecular weights were calculated using conventional broad standard calibration.

In determining xylene solubles, polymer samples were dissolved in boiling xylene and allowed to crystallize at room temperature for 30 min followed by a 10 min quench in an ice bath. The polymer solids were filtered and the filtrate was flashed and the residual component was dried in a vacuum oven at 70° C. for 1 hr. The xylene soluble fraction is defined as a ratio of the soluble weight fraction to the initial sample weight.

An isotactic index (II) test method was used to determine the relative amount of isotactic polypropylene based on the heptane insoluble fraction. A Soxtec Avanti Extraction unit was used to boil and rinse the sample in a cellulose thimble. Polypropylene samples were run with heptane as the solvent. Samples were subjected to refluxing boiling heptane for 3 hr. The insoluble fraction was then dried in a vacuum oven at 70° C. for 1 hr. The Isotactic index (II) is a ratio of the heptane insoluble fraction to the initial sample weight.

In $C^{13}$ NMR Spectroscopy measurements, polymer samples were dissolved in 1,2,4-trichlorobenzene at 10% solids using a 10 mm probe and recorded at 120° C. with deuterobenzene for lock. A pulse width of 90°, 15 second delay, gated decoupling was applied and a minimum of 2,400 transients were collected. Isotacticity is defined as the % mmmm pentad.

As noted previously, the polymerization tests were carried out in bulk-type laboratory reactors. The hydrogen response in the polymerization was measured at hydrogen levels of 5 millimoles, 10 millimoles, and 15 millimoles. In scaled-up actual operations, the polymerization procedure can be expected to be carried out in a continuous-type reactor, for example, a loop-type reactor, as shown schematically in U.S. Pat. No. 4,767,735, with the introduction of hydrogen along with the propylene and catalyst components. In terms of hydrogen level in such continuous polymerization systems, the correspondence of hydrogen level in the batch reactors to use in a continuous reactor would generally equate to 5 millimoles of hydrogen as equivalent to the continuous introduction of hydrogen in an amount of about 14 parts per million (ppm) based upon the propylene feed, 10 millimoles about 29 ppm hydrogen, and 15 millimoles equating to hydrogen concentration in the propylene of about 43 ppm.

Experiments were designed and the results analyzed with the aid of software which allows for error estimation and helps establish whether a factor is a "true" effect. In this study, the test metallocene was supported on 0.85/1 MAO/Silica A support with 0.9 wt % metallocene loading. TEA1 was used throughout in this study. The study varied hydrogen level, reactor temperature and TEA1/catalyst ratio while maintaining the same metallocene loading and MAO level on the catalyst under the conditions set forth in Table II.

TABLE II

| Condition | Low | High |
| --- | --- | --- |
| Hydrogen (mmol) | 5 | 15 |
| Temperature (° C.) | 60 | 70 |
| TEAl/catalyst | 2/1 | 12/1 |

Polymerization data for the test catalyst under the conditions of Table II are set forth in Table III. Activities of up to 8,500 g/g/hr were observed using higher temperatures (65–70° C.) and higher levels of hydrogen (10–15 mmol). Normal polymerization conditions with a bis(indenyl)-type catalyst involve 67° C. with 10 mmol hydrogen and a TEA1/catalyst ratio of 2. Co-catalyst levels generally were not shown to affect activity. Fouling of the reactor walls appeared to improve with increasing TEA1/catalyst ratio, with a TEA1/catalyst ratio of 12 showing very little polymer buildup. Bulk density values were between 0.35 and 0.42 g/cc with no trends indicated under different conditions. The melt flow is strongly affected by both hydrogen level and TEA1/catalyst ratio but not temperature within this range. Melt flows ranged from 9.2 g/10 min up to 28.4 g/10 min. It is thought likely that TEA1 acts as a chain transfer agent thus causing an increase in melt flow. Analysis of molecular weight data shows that the molecular weight distribution is not affected by changes in polymerization conditions. Desirably narrow (~2.6) molecular weight distribution values were obtained for nearly all of the samples. The xylene solubles, which is a measure of atactic content, were also low, with no substantial variation observed as polymerization conditions were changed. NMR analysis of 4 samples showed the correspondingly high tacticity (% mmmm~95%).

TABLE III

| Run # | Temp (° C.) | TEAl/Cat | Activity (g/g/hr) | BD (g/cc) | $T_m$ (° C.) | Mw/1000 | MWD | XS (%) | MF (g/10 min) | % mmmm |
| --- | --- | --- | --- | --- | --- | --- | --- | --- | --- | --- |
| | | | | 5 mmol Hydrogen | | | | | | |
| 1 | 60 | 7/1 | 3,500 | 0.36 | 161.0 | 272 | 3.0 | 0.3 | 9.2 | |
| 2 | 65 | 2/1 | 3,200 | 0.35 | 156.0 | 298 | 2.6 | 0.2 | 11.0 | |
| 3 | 65 | 12/1 | 4,100 | 0.39 | 155.4 | 237 | 2.5 | 0.2 | 15.0 | 95.7 |
| 4 | 70 | 7/1 | 4,900 | 0.38 | 159.0 | 225 | 2.6 | 0.2 | 13.0 | |

TABLE III-continued

| Run # | Temp (° C.) | TEAl/ Cat | Activity (g/g/hr) | BD (g/cc) | $T_m$ (° C.) | Mw/ 1000 | MWD | XS (%) | MF (g/10 min) | % mmmm |
|---|---|---|---|---|---|---|---|---|---|---|
| | | | | 10 mmol Hydrogen | | | | | | |
| 5 | 60 | 2/1 | 6,000 | 0.4 | 158.4 | 216 | 2.9 | 0.2 | 16.8 | 95.7 |
| 6 | 60 | 12/1 | 5,600 | 0.4 | 160.4 | 188 | 2.7 | 0.2 | 16.3 | |
| 7 | 65 | 7/1 | 6,600 | 0.41 | 156.7 | 191 | 2.6 | 0.1 | 17.8 | |
| 8 | 65 | 7/1 | 6,100 | 0.41 | 157.4 | 204 | 2.7 | 0.3 | 16.0 | |
| 9 | 65 | 7/1 | 6,600 | 0.38 | 159.0 | 190 | 2.5 | 0.2 | 16.5 | |
| 10 | 70 | 2/1 | 7,300 | 0.41 | 156.0 | 206 | 2.6 | 0.2 | 15.5 | 96.0 |
| 11 | 70 | 12/1 | 7,000 | 0.41 | 156.4 | 164 | 2.6 | 0.2 | 21.4 | |
| | | | | 15 mmol hydrogen | | | | | | |
| 12 | 60 | 7/1 | 7,700 | 0.41 | 158.0 | 162 | 2.6 | 0.2 | 23 | |
| 13 | 65 | 2/1 | 8,300 | 0.4 | 158.4 | 171 | 2.7 | 0.1 | 19 | 95.8 |
| 14 | 65 | 12/1 | 8,000 | 0.42 | 156.4 | 151 | 2.7 | 0.1 | 28.4 | |
| 15 | 70 | 7/1 | 8,500 | 0.41 | 156.4 | 147 | 2.6 | 0.3 | 26.2 | |

Figure 2:
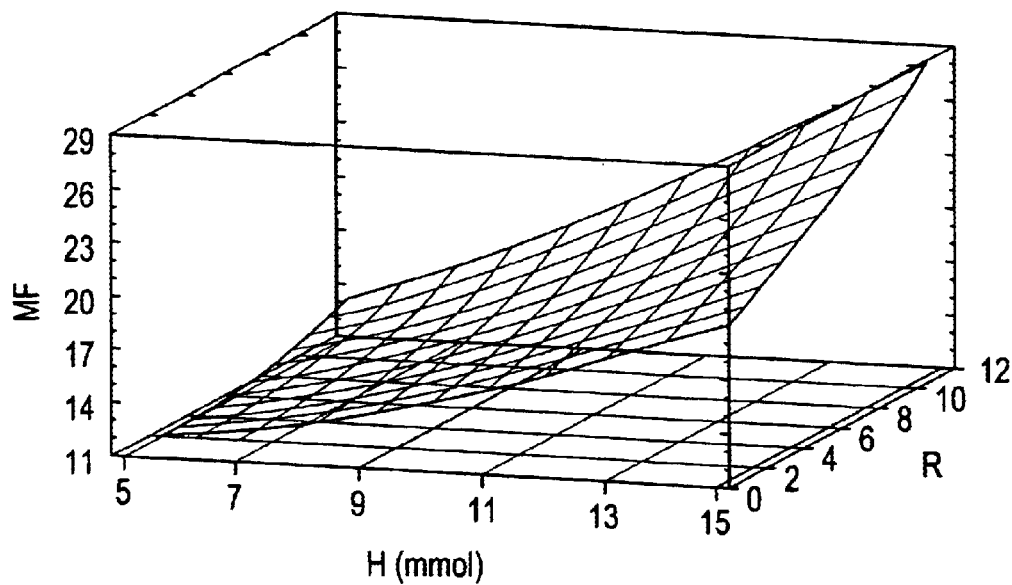
FIG. 2 is a three-dimensional perspective graph illustrating the response of melt flow plotted on the vertical ordinate versus hydrogen in millimoles plotted on the Y axis and the TEA1 catalyst ratio plotted on the C axis.

Turning now to the drawings, FIGS. 1 and 2 show estimated response surfaces for activity and melt flow generated using regression equations, which have been fitted to the data. The regression equations for activity and melt flow are set forth below in Table IV.

TABLE IV

| Function | Equation | $R^2$ |
|---|---|---|
| Activity | Activity = 8849.3 + 1198.1 * hyd − 453.1 * temp + 117.4 * T/C − 16.6 * hyd$^2$ − 5.6 * hyd * temp − 12.2 * hyd * T/C + 4.8 * temp$^2$ + 0.8 * temp * T/C − 3.6 * T/C$^2$ | 98.5% |
| Melt Flow | MF = 37.6 + 0.4 * hyd − 0.7 * temp − 4.6 * T/C + 0.04 * hyd$^2$ − 0.01 * hyd * temp + 0.05 * hyd * T/C + 0.01 * temp$^2$ + 0.06 * temp * T/C + 0.02 * T/C$^2$ | 96.2% |

Where hyd = hydrogen (mmol), temp = temperature (° C.) and T/C = TEAl/catalyst

FIG. 1 illustrates an estimated response surface for activity A in grams of polymer per gram of catalyst plotted on the vertical ordinate as a function of the hydrogen level H in mmol on the Y axis and reactor temperature T in ° C. on the Z axis. The response surface shows projected activity values at hydrogen levels between 5 and 15 mmol and reaction temperature between 60° and 70° C. There is a strong dependence of activity on hydrogen level and a lower dependence on reactor temperature. The corresponding response curve for activity as a function of TEAl/catalyst ratio (not shown) shows no significant dependence on the level of TEAl/catalyst present in the reactor. However, as described above, polymer buildup on the walls of the reactor is lessened with increased cocatalyst levels.

FIG. 2 shows an estimated response surface for melt flow MF plotted on the X axis as a function of hydrogen level H and the TEAl/catalyst ratio R on the Y and Z axes respectively. The response surface shows projected melt flow values at hydrogen levels between 5 and 15 mmol and TEAl/catalyst mole ratios between 2/1 and 12/1. There is a strong dependence of the melt flow on both hydrogen level and TEAl/catalyst level. Reactor temperature does not affect the melt flow to any significant amount.

Figure 3:
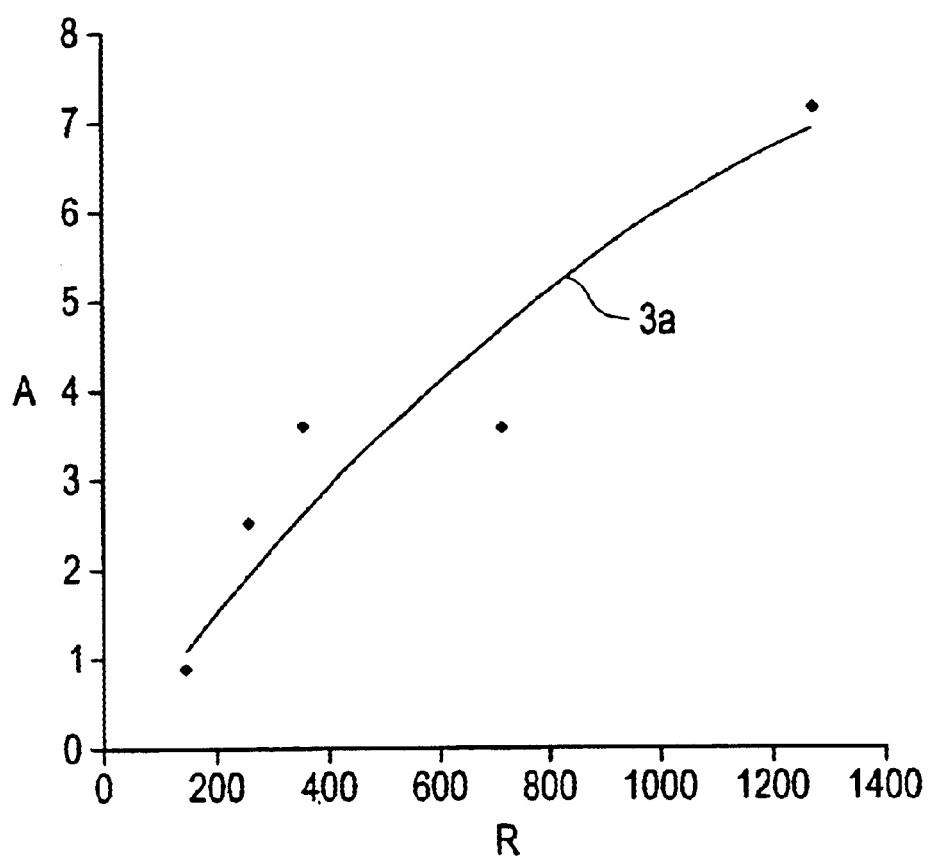
FIG. 3 is a graph illustrating the molar activity of the catalyst isopropylidene (diphenyl methylene 3-tertiary butyl, 5-methyl cyclopentadienyl, 3,6-ditertiary butyl fluorenyl) zirconium dichloride as a function of aluminum/zirconium mole ratio of a methylalumoxane-supported catalyst.

FIG. 3 shows the mole activity A in grams polypropylene per mmol of zirconium plotted on the ordinate versus the aluminum zirconium mole ratio R plotted on the abscissa. As indicated by curve 3a in FIG. 3, the molar activity progressively increases as the aluminum zirconium mole ratio is increased from below 200 to in excess of 1200.

Referring back to Table I, the average particle sizes and surface areas of Silicas A and C are about the same (12 microns and 700~750 $m^2$/g, respectively) while the pore volume of Silica C is more than twice that of Silica A (0.9 vs. 2.1 mL/g). The larger pore volume and pore diameter allow the MAO to penetrate the surface of the silica and be incorporated throughout the particle rather than being concentrated on the surface. Thus, polymerization takes place inside of the support particles and is believed to improve fracture of the catalyst support and therefore leave smaller catalyst fragments in the final resin. MAO on the surface of the particle, as occurs with Support A, causes particle agglomeration and consequently the bulk density of the resulting polymer fluff is lower. Silica Support B has a pore volume of 1.4 mL/g which is sufficient for MAO to be evenly distributed throughout the silica. The silica supports D and E both have much larger particle size (~95 micron) and pore volume (3.1 mL/g) than the other silicas. They differ from each other by their surface area. Support D has a surface area of ~300 $m^2$/g, which is comparable to that of Support B. Support E is much larger, with a surface area comparable to that of silicas A and C (~650 $m^2$/g). Energy Dispersive X-Ray Spectroscopy (EDX) results of MAO/ silica samples for the silicas used in this study showed that only Silica A failed to incorporate MAO throughout the particle. The other silicas showed even distribution of aluminum throughout the particle.

Six supported catalysts were made with a 2.0 wt % metallocene loading using the above silicas A through E. MAO was added to the silica in ratios of 0.5/1 to 1/1. Polymerization runs were done in a 4-liter reactor using 2/1 TEAl/catalyst ratio, 24 mmol hydrogen and 67° C. reactor temperature. A catalyst using 2.5 wt % metallocene loading supported on 0.5/1 MAO/Silica A is used as a reference point to compare with other supports. The results of the polymerization runs are set forth in Table V.

TABLE V

| Run # | Silica | MAO/Si | Wt % Metallocene | Activity (g/g/hr) | MF (g/10 min) | BD (g/cc) | Fouling (mg/g) |
|---|---|---|---|---|---|---|---|
| 16 | A | 0.5/1 | 2.5 | 6,500 | 16.6 | 0.36 | 5.0 |
| 17 | B | 0.7/1 | 2.0 | 4,500 | 19.4 | 0.48 | 5.4 |
| 18 | B | 1/1 | 2.0 | 5,000 | 17.3 | 0.46 | 7.4 |
| 19 | C | 0.9/1 | 2.0 | 5,700 | 19.0 | 0.51 | 4.7 |
| 20 | D | 0.9/1 | 2.0 | 4,200 | 44.6 | 0.47 | 6.5 |
| 21 | E | 0.9/1 | 2.0 | 3,200 | 46.8 | 0.44 | 5.3 |

[1]Data averaged over 3 runs

As indicated the activity of the metallocene supported on Silica A was somewhat higher than for Silica C. The bulk density values are strikingly different, with the Silica A providing a bulk density of 0.36 g/cc compared with 0.51 g/cc for Silica C. The level of polymer buildup on the coupons was about the same for both supports. Both of the Silica B supported catalysts had similar bulk density values (0.46–0.48 g/cc), with the 1/1 MAO/Silica B catalyst having slightly higher activity than that of 0.7/1 MAO/Silica B (5,000 vs. 4,500 g/g/hr). The 1/1 MAO/Silica B catalyst showed higher levels of polymer buildup than for the lower MAO loading. Both of the larger particles of the supports showed lower activity, with the Silica E having the lowest overall activity (3,200 g/g/hr). The bulk density values were 0.44 g/cc (Support E) and 0.47 g/cc (Silica D), which are comparable to those observed using Silica B. Polymer buildup levels were comparable to that of Silica A. The hydrogen response for the Silica D and Silica E supported catalysts appears to be higher than that of the other supported catalysts (under comparable conversion levels).

Table VI shows microstructural data for the different supported catalysts. NMR, xylene solubles, isotactic index and melting temperature are all comparable to each other (and to the catalysts previously discussed). The molecular weight distribution for all but the Silica E also look to be comparable to previous catalysts.

TABLE VI

| Run # | Silica | $T_m$ (°C.) | $M_w/$ 1000 | MWD | Isotactic Index (%) | XS (%) | % mmmm |
|---|---|---|---|---|---|---|---|
| 16 | A | 159.7 | 262 | 2.7 | — | 0.3 | — |
| 17 | B | 159.7 | 166 | 2.7 | 99.4 | 0.2 | 95.1 |
| 18 | B | 157.7 | 168 | 2.7 | 99.6 | 0.1 | |
| 19 | C | 158.0 | 166 | 3.0 | 99.4 | 0.2 | 95.5 |
| 20 | D | 160.7 | 146 | 2.8 | 99.4 | 0.2 | 95.1 |
| 21 | E | 158.4 | 137 | 3.6 | 99.2 | 0.2 | 95.6 |

Additional experimental work was carried out to investigate the role of MAO and metallocene loading on the catalyst performance. These studies were designed to develop a better understanding of how the miPP Cp-Flu-based metallocenes respond to process variables to maximize catalyst productivity while minimizing the amount of fouling observed. Since Silica A appears to be the preferred silica support for Cp-Flu-based metallocenes (although Silica C offers some distinct improvements), Silica A was used in this experimental work. Metallocene loading was adjusted from 0.5 to 2.5 wt % and the theoretical MAO loading on the silica was adjusted from 0.5 to 1.5 parts MAO to one part silica. The catalysts prepared for this work and the polymerization results are reported in Table VII. To illustrate the role of Zr and Al loading on catalyst behavior these values are included in the Table VII as well.

The effect on activity of increasing metallocene loading from 0.5 to 2.5% is given by comparing the results from the following runs of Table VII.

Metallocene Increase Effect % = 100 × [run 32 − run 30]/run 30

= 100 × [run 33 − run 31]/run 31

The activity of the catalyst, Me$_2$C (3-t-Bu-5MeCp) (3,6-di-tBu-Fl) ZrCl$_2$, increases from 28 (low MAO) to 67% (higher MAO) by increasing the metallocene loading from 0.5 to 2.5%. A greater increase in activity was observed for the higher MAO loading catalyst presumably because this support material has higher Al level and is better equipped to activate the higher metallocene loading.

Similarly, the effect of increasing MAO to silica ratio from 0.5 to 1.5 is given by comparing the results from the following runs:

Effect of Increasing MAO Loading % = 100 × [run 31 − run 30]/run 30

= 100 × [run 33 − run 32]/run 32

Increasing MAO loading on the catalyst had a much larger effect on increasing catalyst activity. At the lower metallocene loading, activity was improved by 107% by increasing the Al level on the support. For the higher metallocene loading, even greater improvements were realized with an activity increase of 170%. Activation at higher metallocene loading is clearly less efficient but to maximize catalyst activity, both MAO and metallocene loading should be relatively high.

In order to determine exactly the effect of adjusting metallocene loading and MAO loading on the catalyst, one must consider the molar activity (kg PP/mmol Zr/h) of the different catalysts as reported in Table VIII. Based on molar activity, increasing metallocene loading (no adjustment of Al levels) results in a 65–75% reduction in molar activity. On the other hand, increasing MAO loading results in a 100 to 178% increase in molar activity.

TABLE VII

| | Catalyst Qualities | | | | | Polymerization Results | | | |
|---|---|---|---|---|---|---|---|---|---|
| Run # | % Met | MAO/ Silica | % Zr | % Al | Al/Zr Mole ratio | Activity (g/g/h) | Fouling (mg/g) | MF (g/10') | BD (g/cc) |
| −30 | 0.5 | 0.5 | 0.074 | 15.4 | 702 | 2,900 | 4.7 | 19.8 | 0.36 |
| −31 | 0.5 | 1.5 | 0.074 | 27.8 | 1265 | 6,000 | 2.9 | 12.1 | 0.37 |
| −32 | 2.5 | 0.5 | 0.371 | 15.1 | 138 | 3,700 | 3.5 | 15.8 | 0.35 |
| −33 | 2.5 | 1.5 | 0.371 | 27.2 | 248 | 10,000 | 1.5 | 12.3 | 0.35 |
| −34 | 1.5 | 1.0 | 0.223 | 22.9 | 348 | 8,700 | 1.7 | 17.5 | 0.37 |

Polymerization: runs conducted using 45 mg of catalyst, 24 mmol of H$_2$, 90 mg TEAL, 67° C., 1 h.

TABLE VIII

| | Catalyst Qualities | | | | | Performance | |
|---|---|---|---|---|---|---|---|
| Run # | % Met | MAO/ Silica | % Zr | % Al | Al/Zr Mole ratio | Activity (g/g/h) | Molar Activity ($10^8$ g PP/ mole Zr/h) |
| −30 | 0.5 | 0.5 | 0.074 | 15.4 | 702 | 2,900 | 3.6 |
| −31 | 0.5 | 1.5 | 0.074 | 27.8 | 1,265 | 6,000 | 7.2 |
| −32 | 2.5 | 0.5 | 0.371 | 15.1 | 138 | 3,700 | 0.9 |
| −33 | 2.5 | 1.5 | 0.371 | 27.2 | 248 | 10,000 | 2.5 |
| −34 | 1.5 | 1.0 | 0.223 | 22.9 | 348 | 8,700 | 3.6 |

The data indicates that the increase in metallocene activation (through the molar activity of the catalyst) is predominantly a function of Al/Zr mole ratio. In order to utilize the metallocene most efficiently, the Al to Zr molar ratio should be high. This data would indicate that activation of the metallocene is the most important factor in improving catalyst activity. Simply boosting metallocene level will increase activity, however the efficiency of the metallocene "engine" diminishes (due to the lower Al/Zr ratio) unless the MAO loading is correspondingly increased.

With respect to fouling, it can generally be said that changes that result in boosting catalyst activity (either by increasing MAO or metallocene loading) result in a reduction in fouling. The effect of increasing metallocene loading on fouling (using the same equations as above) results in a 25 to 48% decrease in fouling potential using a standard fouling test. Similarly, increasing the MAO loading resulted in a 38 and 57% reduction for the lower and higher metallocene loading respectively. The lowest fouling was observed with the highest metallocene and MAO loading. This also corresponded to the highest activity of any AR3536-based catalyst (10,000 g/g/h) produced thus far. No appreciable effects were noted on the melt flow or the bulk density as metallocene or MAO loading was adjusted.

Further experimental work was carried out employing a metallocene catalyst characterized by a metallocene conforming to Formula (4) in which the fluorenyl group was unsubstituted. Two silica supports were employed, identified in Table II as Support C and Support F. The metallocene used in this experimental work was isopropylidene (3-tert-butyl-5-methylcyclopoentadienyl) (fluorenyl) zirconium dichloride. In this experimental work, the metallocene loading was varied from 1 weight percent to 3 weight percent, and the MAO loading on the silica support varied from 1 to 1.35 weight parts of MAO to 1 part of silica.

The results of this experimental work in terms of the methylalumoxane loading on the performance of the metallocene supported on Supports C and F is set forth in Table IX. In Table IX, the first column indicates the entry number, the second column indicates the silica used as the support, the third column indicates the metallocene loading in weight percent, and the fourth column indicates the weight ratio of MAO to silica. The fifth column shows the activity of the catalyst in grams per grams per hour. The sixth and seventh columns show the bulk density in grams per cubic centimeter and the melt flow index in grams/10 minutes of the polymer product, and the last column indicates the fouling observed for the catalyst in milligrams per gram. As can be seen from the experimental work reported in Table IX, the metallocene supported on Support F exhibited a somewhat lower bulk density, corresponding to a larger fluff particle size, than the metallocene supported on Support C. The catalyst incorporating Support F showed high productivity associated with low reactor filing at metallocene loadings of 1.0/1.0 compared with the somewhat higher metallocene loading of 1.1/0 and 1.35/0.

TABLE IX

| Entry | Silica | Metallocene Loading (wt %) | MAO/ Silica (wt) | Activity (g/g/h) | BD (g/cc) | MF (g/10 min) | Fouling (mg/g) |
|---|---|---|---|---|---|---|---|
| 1 | F | 1.0 | 1.0/1 | 4900 | 0.44 | 37 | 2.5 |
| 2 | F | 1.0 | 1.1/1 | 5100 | 0.44 | 29 | 3.5 |
| 3 | F | 1.0 | 1.35/1 | 5400 | 0.45 | 27 | 5.4 |
| 4[b)] | C | 1.0 | 1.1/1 | 4700 | 0.48 | 21 | 3.2 |
| 5 | F | 2.0 | 1.0/1 | 6400 | 0.46 | 22 | 2.8 |
| 6 | F | 2.0 | 1.1/1 | 6600 | 0.46 | 21 | 3.5 |
| 7 | F | 2.0 | 1.35/1 | 6500 | 0.45 | 21 | 4.5 |
| 8[b)] | C | 2.0 | 1.1/1 | 7000 | 0.49 | 20 | 2.9 |
| 9 | F | 3.0 | 1.0/1 | 7000 | 0.46 | 30 | 1.5 |
| 10 | F | 3.0 | 1.35/1 | 6800 | 0.46 | 15 | 3.8 |
| 11[b)] | C | 3.0 | 1.1/1 | 7000 | 0.49 | 16 | 2.8 |

[a)]Toluene used for deposition/cationization. Polymn Conditions: 25 mmol hydrogen, ca.720 g propylene, 129 ppm TEAL as scavenger, 70° C., 1 hr.
[b)]H122 as support with the other preparation conditions identical as H202.

The physical properties of the isotactic polypropylene prepared with Support C and Support F supported catalysts are set forth in Table X. In Table X, the second column indicates the support used and the third column indicates the weight ratio of MAO/silica and the metallocene loading in weight percent. Thus, in entry 6, for example, the support employed was Support C having a ratio of MAO to silica of 1.1 to 1.0 and 3.0 weight percent metallocene. The next columns indicate the melt temperature in ° C. and the heat of fusion, respectively. The last three columns indicate the molecular weight, the molecular weight distribution ($M_w/M_n$), and the weight percent xylene solubles in the polymer, respectively.

TABLE X

| Entry | Catalyst Number | Support, MAO/Silica Metallocene Loading (wt %) | $T_m$ (° C.) | $\Delta H$ (J/g) | $M_w$ ($\times 10^{-3}$) | $M_w/M_n$ | X slos (wt %) |
|---|---|---|---|---|---|---|---|
| 1 | F | H202, 1.0/1.0, 1.0 | 142.4 | 75.8 | 132.5 | 2.22 | 0.20 |
| 2 | F | H202, 1.0/1.0, 2.0 | 142.7 | 76.1 | 151.2 | 2.48 | 0.18 |
| 3 | F | H202, 1.0/1.0, 3.0 | 141.4 | 75.5 | 145.7 | 2.40 | 0.22 |
| 4 | C | H122, 1.1/1.0, 1.0 | 143.0 | 78.9 | 162.3 | 2.40 | 0.16 |
| 5 | C | H122, 1.1/1.0, 2.0 | 142.0 | 76.8 | 161.6 | 2.40 | 0.24 |
| 6 | C | H122, 1.1/1.0, 3.0 | 143.0 | 78.5 | 171.7 | 2.60 | 0.20 |

The unsubstituted fluorenyl ligand structure results in polymers of somewhat lower melting temperature than those associated with substituted ligand structure. This relationship was observed for catalysts supported on both silica Supports C and F.

Having described specific embodiments of the present invention, it will be understood that modifications thereof may be suggested to those skilled in the art, and it is intended to cover all such modifications as fall within the scope of the appended claims.

What is claimed:

1. A supported metallocene catalyst composition useful in the polymerization of olefins comprising:
   a. a particulate silica support having an average particle size within the range of 10–50 microns and a surface area within the range of 200–800 m²/g;
   b. an alkylalumoxane cocatalyst component incorporated onto said silica support to provide a weight ratio of alkylalumoxane to silica of at least 0.8:1;
   c. a metallocene catalyst component supported on said particulate silica support in an amount of at least 1 weight percent of said silica and said alkylalumoxane and characterized by the formula:

$$B(CpRaRb)(FlR'_2)MQ_2$$

wherein: Cp is a substituted cyclopentadienyl group, Fl is a substituted fluorenyl group, and B is a structural bridge between Cp and Fl imparting stereorigidity to said catalyst, Ra is a substituent on the cyclopentadienyl group which is in a distal position to the bridge and comprises a bulky group of the formula $XR^*_3$ in which X is carbon or silicon and $R^*$ is the same or different and is chosen from hydrogen or a hydrocarbyl group having from 1–20 carbon atoms, provided that at least one $R^*$ is not hydrogen, Rb is a substituent on the cyclopentadienyl ring which is proximal to the bridge and positioned non-vicinal to the distal substituent and is of the formula $YR\#_3$ in which Y is silicon or carbon and each $R\#$ is the same or different and chosen from hydrogen or a hydrocarbyl group containing from 1 to 7 carbon atoms and is less bulky than the substituent Ra, each R' is the same or different and is a hydrocarbyl group having from 1–20 carbon atoms with one R' being substituted at a non-proximal position on the fluorenyl group and the other R' being substituted at an opposed non-proximal position on the fluorenyl group, M is a Group IVB transition metal or vanadium; Q is a halogen or a $C_1$–$C_4$ alkyl group; and
   d. said alkylalumoxane component and said metallocene component being present in relative amounts to provide an Al/M mole ratio of at least 150.

2. The composition of claim 1 wherein said alkyl aluminum component and said metallocene component are present in an amount to provide an Al/M mole ratio of at least 250.

3. The composition of claim 1 wherein said metallocene is present on said silica support in an amount of at least 1.5 wt %.

4. The composition of claim 1 wherein said alkylalumoxane is present in an amount to provide a weight ratio of alkylalumoxane to said silica of at least 1:1.

5. The composition of claim 1 wherein the substituent Ra of said metallocene component is a phenyl or substituted phenyl group.

6. The composition of claim 1 wherein the Ra substituent of said metallocene component is selected from the group consisting of $C(CH_3)_3$, $C(CH_3)_2Ph$, $CPh_3$, and $Si(CH_3)_3$.

7. The composition of claim 6 wherein the Rb substituent of said metallocene component is $CH_3$.

8. The composition of claim 7 wherein the substituent R' is $C(CH_3)_3$.

9. The composition of claim 1 wherein the bridge B of said metallocene component is selected from the group consisting of an alkylidene group having 1 to 20 carbon atoms, a dialkyl germanium or silicon or siloxane, alkyl phosphine or amine.

10. The composition of claim 9 wherein B is an isopropylidene or a diphenyl methylene group.

11. The composition of claim 9 wherein M is zirconium or titanium.

12. The composition of claim 10 wherein Q is independently a halogen or methyl group.

13. A supported metallocene catalyst useful in the polymerization of olefins comprising:
   a. a particulate silica support having an average particle size within the range of 10–50 microns, a surface area within the range of 200–800 m²/g, and a pore volume within the range of 0.9–2.1 ml/g;
   b. an alkylalumoxane cocatalyst component incorporated onto said silica support to provide a weight ratio of alkylalumoxane to silica within the range of 1:1–2:1;
   c. a metallocene catalyst component supported on said particulate silica support in an amount of at least 1 weight percent of said silica and said alkylalumoxane and characterized by the formula:

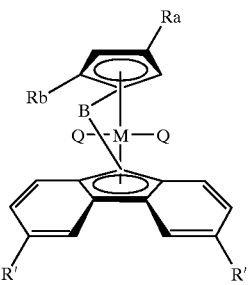

(3)

wherein: Ra is a bulky hydrocarbyl group containing from 4 to 20 carbon atoms, Rb is a methyl, ethyl or isopropyl group, wherein the Rb is less bulky than the Ra; R' is a bulky hydrocarbyl group containing from 4 to 20 carbon atoms, M is a transition metal selected from the group consisting of titanium, zirconium, hafnium, and vanadium, Q is a halogen or a $C_1$–$C_4$ hydrocarbyl group, B is a structural bridge extending between the cyclopentadienyl and fluorenyl groups, and is an ethylene group or is characterized by the formula:

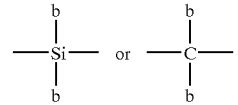

wherein b is a $C_1$–$C_4$ alkyl group or a phenyl group.

14. The composition of claim 1 wherein the substituent Ra of the metallocene catalyst component is selected from the group consisting of a tertbutyl group, a phenyl group, and substituted phenyl group.

15. The composition of claim 14 wherein the substituent Ra of the metallocene catalyst component is a phenyldimethyl methyl group, or a triphenylmethyl group.

16. The composition of claim 14 wherein the substituent Ra of the metallocene catalyst component is a tertbutyl group and the substituent Rb is a methyl group.

17. The composition of claim 13 wherein the substituent R' of said metallocene component is selected from the group consisting of an isobutyl group, a tertiary butyl group, a phenyldimethyl methyl group, and a triphenylmethyl group.

18. The composition of claim 13 wherein the bridge B of said metallocene component is selected from the group consisting of a dimethylsilyl group, a diphenylsilyl group, a diphenylmethylene group, and an isopropylidene group.

19. The composition of claim 13 wherein M is zirconium or hafnium and Q is a chlorine or methyl group.

20. The composition of claim 13 wherein said isospecific metallocene component comprises isopropylidene (3-tertiary butyl, 5-methyl cyclopentadienyl, 3,6-ditertiary butyl fluorenyl) zirconium dichloride or diphenyl methylene (3-tertiary butyl, 5-methyl cyclopentadienyl, 3,6-ditertiary butyl fluorenyl) zirconium dichloride.

21. The composition of claim 13 wherein the substituent Ra of the metallocene catalyst component is a tertbutyl group, the substituent Rb is a methyl group, the substituent R' is a tertbutyl group, the transition metal M is a zirconium or hafnium, Q is a chlorine or methyl group, and the bridge B is a dimethylsilyl group, an isopropylidene group or a diphenyl methylene group.

22. A supported metallocene catalyst composition useful in the polymerization of olefins comprising:
   a. a particulate silica support of a spheroidal shape having an average particle size of about 21 microns, a pore volume of about 1.7 ml/g, and a surface area of about 600 m$^2$/g;
   b. an alkylalumoxane cocatalyst component incorporated onto said silica support to provide a weight ratio of alkylalumoxane to silica of at least 0.8:1;
   c. a metallocene catalyst component supported on said particulate silica support in an amount of at least 1 weight percent of said silica and said alkylalumoxane and characterized by the formula:

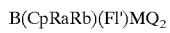

wherein: Cp is a substituted cyclopentadienyl group, Fl' is an unsubstituted fluorenyl group or a fluorenyl group which is symmetrically substituted at the 3 and 6 positions with $C_1$–$C_4$ hydrocarbyl groups, and B is a structural bridge between Cp and Fl' imparting stereorigidity to said catalyst, Ra is a substituent on the cyclopentadienyl group which is in a distal position to the bridge and comprises a bulky group of the formula $XR*_3$ in which X is carbon or silicon and R* is the same or different and is chosen from hydrogen or a hydrocarbyl group having from 1–20 carbon atoms, provided that at least one R* is not hydrogen, Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group containing from 1 to 7 carbon atoms and is less bulky than the substituent Ra, M is a Group IVB transition metal or vanadium; Q is a halogen or a $C_1$–$C_4$ alkyl group; and
   d. said alkylalumoxane component and said metallocene component being present in relative amounts to provide an Al/M mole ratio of at least 150.

23. The composition of claim 22 wherein the substituent Ra of said metallocene component is a phenyl group or a 2,6 substituted phenyl group having substituents selected from the groups consisting of methyl, ethyl, isopropyl or trifluoromethyl groups.

24. The composition of claim 22 wherein the Ra substituent of said metallocene component is a phenyl group or a substituted phenyl group or is selected from the group consisting of $C(CH_3)_3$, $C(CH_3)_2Ph$, $CPh_3$, and $Si(CH_3)_3$.

25. The composition of claim 24 wherein the Rb substituent of said metallocene component is $CH_3$.

26. The composition of claim 25 wherein the substituent Ra is $C(CH_3)_3$.

27. The composition of claim 26 wherein Fl' is an unsubstituted fluorenyl group.

28. The composition of claim 27 wherein B is an isopropylidene group.

29. In a method for the isospecific propagation of a polymer chain derived from an ethylenically-unsaturated monomer, comprising:
   a. providing a supported metallocene catalyst comprising an isospecific metallocene catalyst component of the formula:

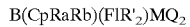

wherein: Cp is a substituted cyclopentadienyl group, Fl is a substituted fluorenyl group, and B is a structural bridge between Cp and Fl imparting stereorigidity to said catalyst, Ra is a substituent on the cyclopentadienyl group which is in a distal position to the bridge and comprises a bulky group of the formula $XR*_3$ in which X is carbon or silicon and R* is the same or different and is chosen from hydrogen or a hydrocarbyl group having from 1–20 carbon atoms, provided that at least one Rb is not hydrogen, Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group containing from 1 to 7 carbon atoms and is less bulky than the substituent Ra, each R' is the same or different and is a hydrocarbyl group having from 1–20 carbon atoms with one R' being substituted at a non-proximal position on the fluorenyl group and the other R' being substituted at an opposed non-proximal position on the fluorenyl group, M is a Group IVB transition metal or vanadium; an alkylalumoxane cocatalyst component; a particulate silica support having an average particle size within the range of 10–50 microns and a surface area within the range of 200–800; and said metallocene catalyst component and said alumoxane cocatalyst component being supported on said particulate silica support in an amount to provide a weight ratio of said alumoxane to said silica support of at least 0.8 and a metallocene loading of at least 1 weight percent; contacting said catalyst in a polymerization reaction zone with an ethylenically-unsaturated monomer which contains 3 or more carbon atoms or which is a substituted vinyl compound; and
   b. operating said reaction zone under a temperature within the range of 55–70° C. to provide isospecific polymerization of said monomer at an activity of at least 1000 g/g/hr to produce a polymer having a melting temperature of at least 155° C.

30. The method of claim 29 wherein said monomer is propylene, which is polymerized to produce isotactic polypropylene homopolymer.

31. The method of claim 29 wherein said catalyst is contacted in said polymerization reaction zone with a mixture of propylene and ethylene to produce an isotactic ethylene propylene copolymer.

32. The method of claim 31 wherein ethylene is supplied to said reaction zone in an amount to produce an isotactic ethylene propylene copolymer having an ethylene content of no more than 10 weight percent ethylene.

33. The method of claim 29 wherein the substituent Ra of said metallocene component is a phenyl group or a substituted phenyl group.

34. The method of claim 29 wherein hydrogen is supplied to said reaction zone.

35. The method of claim 34 wherein said hydrogen is provided to the reaction zone to provide a hydrogen content of at least 20 ppm based upon said monomer.

36. The method of claim 29 further comprising the introduction of an alkylaluminum cocatalyst into said polymerization reaction zone in an amount to provide a ratio of aluminum to said transition metal within the range of 50–8000.

37. The method of claim 36 wherein the Ra substituent of said metallocene component is a phenyl group or a substituted phenyl group or is selected from the group consisting of $C(CH_3)_3$, $C(CH_3)2Ph$, $CPh_3$, and $Si(CH_3)_3$.

38. The method of claim 37 wherein the Rb substituent of said metallocene component is $CH_3$.

39. The method of claim 36 wherein the bridge B of said metallocene component is selected from the group consisting of an alkylidene group having 1 to 20 carbon atoms, a dialkyl germanium or silicon or siloxane, alkyl phosphine or amine.

40. The method of claim 39 wherein B is an isopropylidene group.

41. The method of claim 40 wherein M is zirconium or titanium.

42. The method of claim 41 wherein Q is independently a halogen or methyl group.

43. The method of claim 42 wherein said fluorenyl group is substituted with R' at the 3 and 6 positions.

44. In a method for the isospecific propagation of a polymer chain derived from an ethylenically-unsaturated monomer, comprising:
   a. providing a supported metallocene catalyst comprising an isospecific metallocene catalyst component of the formula:

$B(CpRaRb)(Fl')MQ_2$ wherein: Cp is a substituted cyclopentadienyl group, Fl' is an unsubstituted fluorenyl group or a fluorenyl group which is symmetrically substituted at the 3 and 6 positions with $C_1$–$C_4$ alkyl groups, phenyl groups or 2,6 substituted phenyl groups, and B is a structural bridge between Cp and Fl' imparting stereorigidity to said catalyst, Ra is a substituent on the cyclopentadienyl group which is in a distal position to the bridge and comprises a bulky group of the formula $XR^*_3$ in which X is carbon or silicon and $R^*$ is the same or different and is chosen from hydrogen or a hydrocarbyl group having from 1–20 carbon atoms, provided that at least one $R^*$ is not hydrogen, Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group containing from 1 to 7 carbon atoms and is less bulky than the substituent Ra, M is a Group IVB transition metal or vanadium; Q is a halogen or a $C_1$–$C_4$ alkyl group; and
   (ii) an alkylalumoxane cocatalyst component;
   (iii) a particulate silica support having an average particle size of about 21 microns, a pore volume of about 1.7 ml/g, and a surface area of about 600 m²/g; and
   (iv) said metallocene catalyst component and said alumoxane cocatalyst component being supported on said particulate silica support in an amount to provide a weight ratio of said alumoxane to said silica support of at least 0.8 and a metallocene loading of at least 1 weight percent.
   b. contacting said catalyst in a polymerization reaction zone with an ethylenically-unsaturated monomer which contains 3 or more carbon atoms or which is a substituted vinyl compound; and
   c. operating said reaction zone under a temperature within the range of 65–70° C. to provide isospecific polymerization of said monomer at an activity of at least 1000 g/hr. to produce a polymer having a melting temperature of at least 140° C.

45. The method of claim 44 further comprising the introduction of an alkylaluminum cocatalyst into said polymerization reaction zone in an amount to provide a ratio of aluminum to said transition metal within the range of 50–8000.

46. The method of claim 44 wherein the Ra substituent of said metallocene component is selected from the group consisting of $C(CH_3)_3$, $C(CH_3)2Ph$, $CPh_3$, and $Si(CH_3)_3$.

47. The method of claim 46 wherein the Rb substituent of said metallocene component is $CH_3$.

48. The method of claim 47 wherein the substituent Ra is $C(CH_3)_3$.

49. The method of claim 48 wherein Fl' is an unsubstituted fluorenyl group.

50. The method of claim 49 wherein B is an isopropylidene group.

51. In a method for the isospecific propagation of a polymer chain derived from an ethylenically-unsaturated monomer, comprising:
   a. providing a supported metallocene catalyst comprising an isospecific metallocene catalyst component of the formula:

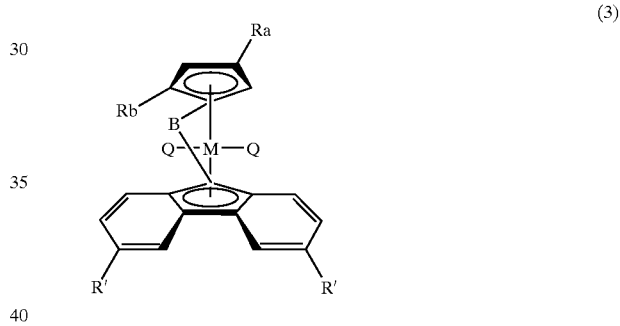

(3)

wherein: Ra is a bulky hydrocarbyl group containing from 4 to 20 carbon atoms, Rb is a methyl or ethyl group, R' is a bulky hydrocarbyl group containing from 4 to 20 carbon atoms, M is a transition metal selected from the group consisting of titanium, zirconium, hafnium, and vanadium, Q is a halogen or a $C_1$–$C_4$ hydrocarbyl group, B is a structural bridge extending between the cyclopentadienyl and fluorenyl groups, and is an ethylene group or is characterized by the formula:

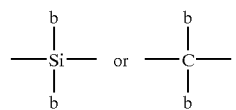

wherein: b is a $C_1$–$C_4$ alkyl group or a phenyl group, an alkylalumoxane cocatalyst component; a particulate silica support having an average particle size within the range of 10–50 microns and a surface area within the range of 200–800; and said metallocene catalyst component and said alumoxane cocatalyst component being supported on said particulate silica support in an amount to provide a weight ratio of said alumoxane to said silica support of at least 0.8 and a metallocene loading of at least 1 weight percent;
   b. contacting said catalyst in a polymerization reaction zone with propylene; and C. operating said reaction zone under a temperature within the range of 60–70° C. to provide isospecific polymerization of said propylene at an activity of at least 1000 g/g/hr to produce a polymer having a melting point of at least 155° C.

52. The method of claim 51 wherein the substituent Ra of the metallocene catalyst component is selected from the group consisting of an isobutyl group, a tertiary butyl group, a phenyl group, a substituted phenyl group, a phenyldimethyl methyl group, and a triphenylmethyl group.

53. The method of claim 51 wherein the substituent Ra of the metallocene catalyst component is an isobutyl group or a tertiary butyl and the substituent Rb is a methyl group.

54. The method of claim 53 wherein the substituent R' of said metallocene component is selected from the group consisting of an isobutyl group, a phenyl group, a substituted phenyl group, a phenyldimethyl methyl group, and a triphenylmethyl group.

55. The method of claim 51 wherein the bridge B of said metallocene component is selected from the group consisting of a dimethylsilyl group, a diphenylsilyl group, a diphenylmethylene group, and an isopropylidene group.

56. The method of claim 55 wherein M is zirconium or hafnium and Q is a chlorine or methyl group.

57. The method of claim 51 wherein said isospecific metallocene component comprises isopropylidene (3-tertiary butyl, 5-methyl cyclopentadienyl) (3,6-ditertiary butyl fluorenyl) zirconium dichloride or diphenyl methylene (3-tertiary butyl, 5-methyl cyclopentadienyl) (3,6-ditertiary butyl fluorenyl) zirconium dichloride.

* * * * *

UNITED STATES PATENT AND TRADEMARK OFFICE
CERTIFICATE OF CORRECTION

PATENT NO. : 6,855,783 B2
DATED : February 15, 2005
INVENTOR(S) : William J. Gauthier et al.

It is certified that error appears in the above-identified patent and that said Letters Patent is hereby corrected as shown below:

Column 11,
Line 19, replace "110° C" with -- 10° C --.

Signed and Sealed this

Twentieth Day of September, 2005

JON W. DUDAS
*Director of the United States Patent and Trademark Office*